(12) United States Patent
Allen et al.

(10) Patent No.: US 8,856,144 B2
(45) Date of Patent: *Oct. 7, 2014

(54) TYPED RELEVANCE SCORES IN AN IDENTITY RESOLUTION SYSTEM

(75) Inventors: Thomas B. Allen, Henderson, NV (US); Barry M. Caceres, Las Vegas, NV (US)

(73) Assignee: International Business Machines Corporation, Armonk, NY (US)

( * ) Notice: Subject to any disclaimer, the term of this patent is extended or adjusted under 35 U.S.C. 154(b) by 235 days.

This patent is subject to a terminal disclaimer.

(21) Appl. No.: 13/552,342

(22) Filed: Jul. 18, 2012

(65) Prior Publication Data

US 2012/0284263 A1 Nov. 8, 2012

Related U.S. Application Data

(63) Continuation of application No. 13/030,935, filed on Feb. 18, 2011.

(51) Int. Cl.
*G06F 17/30* (2006.01)
*G06Q 30/02* (2012.01)

(52) U.S. Cl.
CPC ................................ *G06Q 30/02* (2013.01)
USPC ................. 707/749; 707/692; 707/728

(58) Field of Classification Search
USPC .......................... 707/692, 728, 749
See application file for complete search history.

(56) References Cited

U.S. PATENT DOCUMENTS

| | | | |
|---|---|---|---|
| 7,167,858 B2 * | 1/2007 | Naeymi-Rad et al. | 707/999.006 |
| 7,266,566 B1 | 9/2007 | Kennaley et al. | |
| 7,657,540 B1 * | 2/2010 | Bayliss | 707/999.1 |
| 2007/0233656 A1 * | 10/2007 | Bunescu et al. | 707/3 |
| 2009/0089630 A1 | 4/2009 | Goldenberg et al. | |
| 2009/0198678 A1 * | 8/2009 | Conrad et al. | 707/5 |
| 2009/0271394 A1 * | 10/2009 | Allen et al. | 707/5 |
| 2010/0161566 A1 | 6/2010 | Adair et al. | |
| 2010/0161602 A1 | 6/2010 | Caceres | |
| 2011/0047167 A1 * | 2/2011 | Caceres | 707/749 |

FOREIGN PATENT DOCUMENTS

| | | |
|---|---|---|
| JP | 11053435 A | 2/1999 |
| JP | 3252104 B2 | 1/2002 |
| WO | 2009018644 A1 | 2/2009 |

OTHER PUBLICATIONS

Indrajit Bhattacharya & Lise Getoor, "Collective Entity Resolution in Relational Data", ACM Transactions on Knowledge Discovery from Data, vol. 1, No. 1, Article 5 (Mar. 2007).*
John R. Talburt et al., "Entity Identification in Documents Expressing Shared Relationships", Proceedings of the 11th WSEAS International Conference on Systems, Jul. 23-25, 2007, pp. 224-229.*
Hanna Kopcke & Erhard Rahm, "Frameworks for Entity Matching: A Comparison", Elsevier, Data & Knowledge Engineering 69, pp. 197-210, available online Oct. 14, 2009.*

(Continued)

*Primary Examiner* — Rehana Perveen
*Assistant Examiner* — Scott A Waldron
(74) *Attorney, Agent, or Firm* — Patterson & Sheridan, LLP (57) ABSTRACT

Techniques are disclosed for configuring an identity resolution system to support distinct relevance types. Identity records are accessed that are assigned relevance scores of distinct relevance types. Upon determining that the identity records refer to a common individual, the identity records are resolved into an entity representing the common individual. Relevance scores of the distinct relevance types are then determined for the entity, based on the identity records.

20 Claims, 6 Drawing Sheets

| ENTITY ID (302) | IDENTITY RECORD ID (205) | NAME (304) | RELEVANCE SCORES (306) |
|---|---|---|---|
| 1 | 101 | JOHN SMITH | 50, FRAUD, 20, SENSITIVE ACCESS |
| 1 | 102 | JOHNNY SMITH | 80, SENSITIVE ACCESS |

(56) References Cited

OTHER PUBLICATIONS

IBM, "Relationship Resolution Information Center, Version 4.2", published 2009, pp. 1-21.*

U.S. Application entitled Typed Relevence Scores in an Identity Resolution System, U.S. Appl. No. 13/030,935, filed Feb. 18, 2011.

Hassanzadeh, Oktie et al., A Framework for Semantic Link Discovery over Relational Data, Proceeding of the 18th ACM conference on Information and knowledge management, Nov. 2009, pp. 1027-1036, ACM, New York, New York, United States.

Singla, Parag et al., Entity Resolution with Markov Logic, Proceedings of the Sixth International Conference on Data Mining, 2006, pp. 572-582, IEEE Computer Society, Washington, DC, United States.

* cited by examiner

| | | |
|---|---|---|
| 205 | Identity record ID | 101 |
| 206 | First name | John |
| 208 | Last name | Smith |
| 210 | Date of birth | 01/01/1970 |
| 212 | Gender | Male |
| 214 | Address | 123 Main St., Las Vegas, NV 89123 |
| 216 | Phone number | 702-456-1111 |
| 218 | Email | jsmith@example.com |
| 220 | SSN | 111-11-1111 |

| ENTITY ID | IDENTITY RECORD ID | NAME | RELEVANCE SCORES |
|---|---|---|---|
| 1 | 101 | JOHN SMITH | 50 FRAUD, 20 SENSITIVE ACCESS |
| 1 | 102 | JOHNNY SMITH | 80 SENSITIVE ACCESS |

FIG. 3

| ENTITY ID | RELEVANCE SCORES |
|---|---|
| 1 | 50 FRAUD, 80 SENSITIVE ACCESS, 65 OVERALL |

TYPED RELEVANCE SCORES IN AN IDENTITY RESOLUTION SYSTEM

CROSS-REFERENCE TO RELATED APPLICATIONS

This application is a continuation of co-pending U.S. patent application Ser. No. 13/030,935, filed Feb. 18, 2011. The aforementioned related patent application is herein incorporated by reference in its entirety.

BACKGROUND

Identity resolution applications typically perform one or both of identity resolution and relationship resolution. Identity resolution attempts to answer the question "Who is who?"—i.e., determines whether multiple records that appear to describe different identities actually refer to the same entity (e.g., individual). For example, records identifying two women with different last names may in fact refer to the same woman having both a familial surname and a married surname. Relationship resolution attempts to answer the question "Who knows whom?" in order to determine benefits and/or risks of relationships among identities, such as customers, employees, vendors, and so forth, e.g., by cross-referencing data from various sources. For example, a relationship may be identified between two individuals sharing a common address or telephone number. An example of an identity resolution application is InfoSphere Identity Insight, available from International Business Machines Corp. (IBM®) of Armonk, N.Y.

SUMMARY

Embodiments of the invention provide a computer-implemented method, computer program product and system for performing an operation that includes accessing a plurality of identity records, where the plurality of identity records includes at least a first identity record having a relevance score of a first relevance type. The plurality of identity records further includes a second identity record having a relevance score of a second relevance type different from the first relevance type. The operation also includes resolving, upon determining the plurality of identity records refer to a common individual, the plurality of identity records into an entity representing the common individual. The operation also includes determining, for the entity representing the common individual and from the plurality of identity records, at least a relevance score of the first relevance type and a relevance score of the second relevance type.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention provide an application for identity resolution that is configured to process inbound identity records based on relevant identities, entities, conditions, activities, or events. In particular, the application may be configured to resolve identity records to entity accounts, each representing a distinct individual. As used herein, an entity account (or entity) refers to a collection of one or more identity records that are believed to describe the same physical entity. As an example, when "Bob Smith" checks into a hotel room, a home address and telephone number from hotel check-in records may be used to match him as being the same person as an entity account for a "Robert Smith" having the same address and phone number. To match "Bob Smith" to the entity account for "Robert Smith", the identity record representing "Bob Smith" is compared to a set of individuals, each represented by a respective entity.

In one embodiment, the process of resolving identity records and detecting relationships between entities may be performed using a pre-determined or configurable entity resolution rules. Typically, relationships between two entities are derived from information (e.g., a shared address, employer, telephone number, etc.) in identity records that indicate a relationship between the two entities. Two examples of such rules include the following:

If the inbound identity record has a matching "Social Security Number" and close "Full Name" to an existing entity, then resolve the new identity to the existing entity.

If the inbound identity record has a matching "Phone Number" to an existing entity, then create a relationship between the entity of the inbound identity record and the one with the matching phone number.

The first rule adds a new inbound record to an existing entity, where the second creates a relationship between two entities based on the inbound record. Of course, the entity resolution rules may be tailored based on the type of inbound identity records and to suit the needs of a particular case.

In one embodiment, the application for identity resolution may also include rules for detecting relevant identities, identities, conditions, or events, i.e., rules for generating alerts based on incoming identity records. For example, a rule may check the attributes of an inbound identity record and generate an alert when a particular match is found (e.g., the inbound identity record is of interest because it includes an address within a particular zip-code). Or an alert rule may specify situations where an assigned role of an inbound identity record conflicts with an assigned role of another identity record with which the inbound record has a relationship at zero or more degrees (e.g., an identity with an assigned role of "Employee" has a strong relationship to an identity with an assigned role of "Vendor"). As another example, an alert rule may be defined as a combination of both methods (e.g., alert whenever an identity with the "Nevada Gaming Black List" role also has the "Hotel Guest" role and the hotel involved is located in the state of "Nevada"). Of course, the relevance rules used may be tailored to suit the needs of a particular case.

In one embodiment, the application for identity resolution generates an alert when the existence of a particular identity record (typically an inbound record being processed) causes some condition to be satisfied that is relevant in some way and that may require additional scrutiny by a user (e.g., a business analyst, an investigator of a police department, etc.). The result of these processes is typically a list of alerts about identities that should be examined by the user. Such alerts may assist the user in identifying both benefits (e.g., potential opportunities) and risks (e.g., potential threats and/or fraud).

In one embodiment, the application for identity resolution is further configured to generate a list of entities related to an inbound identity record, based on an entity resolution search. Such an application may not necessarily have any need of alerting. For example, security personnel may input personal data of a traveler, as the traveler enters a country, to check the identity of the traveler against a watch list. In particular, the inbound identity record (i.e., of the traveler) need not be loaded into the application, but may nevertheless be entity-resolved against existing entities of the application. Further, the existing entities may contain identity records that include relevance scores provided by a user. For example, a user may provide a higher relevance score for a person of greater significance in the watch list. Entity-resolving the inbound identity record may yield a list of entity records (and contained identity records thereof) determined to relate to or resolve with the inbound identity record. The application may assign a relevance score to the inbound identity record. The relevance score represents a measure of how important the individual represented inbound identity record is to the user performing the search.

In one embodiment, the application for identity resolution may also determine relevant entities outside of the context of watch lists. For example, both relevant and seemingly non-relevant identity records may be provided to the application. However, a user of the application may wish to find relevant entities without having to manage alerts (or lifecycles thereof). For instance, the user may have a set of very important persons (VIPs) with whom the user does business and to whom the user provides special services. The user may wish to ensure that any persons related to those VIPs are invited to experience a similar level of service. In this case, the user may wish to identify all entities related to the VIPs, ranked by an association relevance determined from a relationship between the VIP and another individual and the relevance of the VIP. The user may not wish to configure rules for or otherwise manage alerts—the user merely wishes to know "Who are my most relevant entities?" Further, the user need not be encumbered with a task of sifting through a list of alerts to pick out entities which happen to be alerted on.

In one embodiment, the application for identity resolution is further configured to provide typed relevance scores, or relevance scores that are qualified by a relevance type. Each identity record and/or entity may be associated with the relevance scores that are qualified by relevance type. The relevance score of each identity record or entity characterizes a level of importance of a given relevance type, where the level of importance is attributed to the respective identity record or entity. For example, assume that relevance types include "threat" and "opportunity". Relevance scores measuring a degree of threat may be used to generate and/or maintain criminal watch lists. Relevance scores measuring a degree of opportunity may be used to identify customers that are desirable targets of a new business proposal. Examples of such customers may include repeat customers, customers with a high net worth, customers designated as VIPs and/or persons associated therewith, etc. Of course, those skilled in the art will recognize that other relevance types are broadly contemplated. For example, in an alternative embodiment, the relevance types may include one or more of "nuisance", "felon", "fraud", "sensitive access", "purchaser", "competitor", "vendor", and "employee rank".

Depending on the embodiment, the identity records that resolve to an entity may each have a relevance score of a distinct relevance type. Further, one or more of the identity records may have multiple relevance scores, each pertaining to a distinct relevance type. Each relevance score and/or relevance type of an identity record may be provided to or determined by the application. For instance, a user may provide relevance scores for individuals of known relevance. Further, for each relevance type, the application may determine a relevance score for an entity, based on one or more relevance scores of identity records that resolve to the entity.

Accordingly, the application for identity resolution is configured to support data analysis from perspectives of distinct relevance types. For instance, a data analyst may use the application to generate reports more efficiently and/or conveniently at least in some cases. Such reports may include a report on the top ten threats, a report on the top ten business opportunities, a report on the top ten entities who are both considered a threat and have access to the highest level of sensitive information within an organization, etc. Alternatively, the application may be configured to generate alerts when one or more entities satisfy criteria for identifying entities who are both considered a threat and have access to the highest level of sensitive information within an organization. Advantageously, the data analyst need not sift through the entities and/or identity records to attempt to infer the relevance type of a given relevance score. The data analyst also need not refer to other data sources to determine the relevance type of a given relevance score. Further, the data analyst may generate reports without having to reconfigure the identity resolution application and/or capture relevance scores every time a different relevance type is desired in the reports.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present invention, a user may request to execute an application in the cloud, where the cloud provides an API that supports dual-state objects. For example, the cloud may provide an application server that supports the API. To the extent that the application uses dual-state objects, the processing and/or memory costs associated with executing the application in the cloud may be reduced relative to a scenario in which the API does not support dual-state objects. Having the application execute in the cloud allows the user to manage execution of the application from any computing system attached to a network connected to the cloud (e.g., the Internet).

As described above, the cloud may provide an application server that supports the API. The application server may provide services to applications for security, state maintenance, data access and persistence, via one or more application programming interfaces (APIs). In one embodiment, the application server conforms to the Java Platform, Enterprise Edition (Java EE). As is known, Java EE is a widely used platform for server programming in the Java™ programming language. The Java EE-compliant application server may include one or more containers, such as a Servlet container and an Enterprise JavaBeans (EJB) container, and may provide services such as Java Naming and Directory Interface (JNDI), Java Message Service (JMS), and connection pooling.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
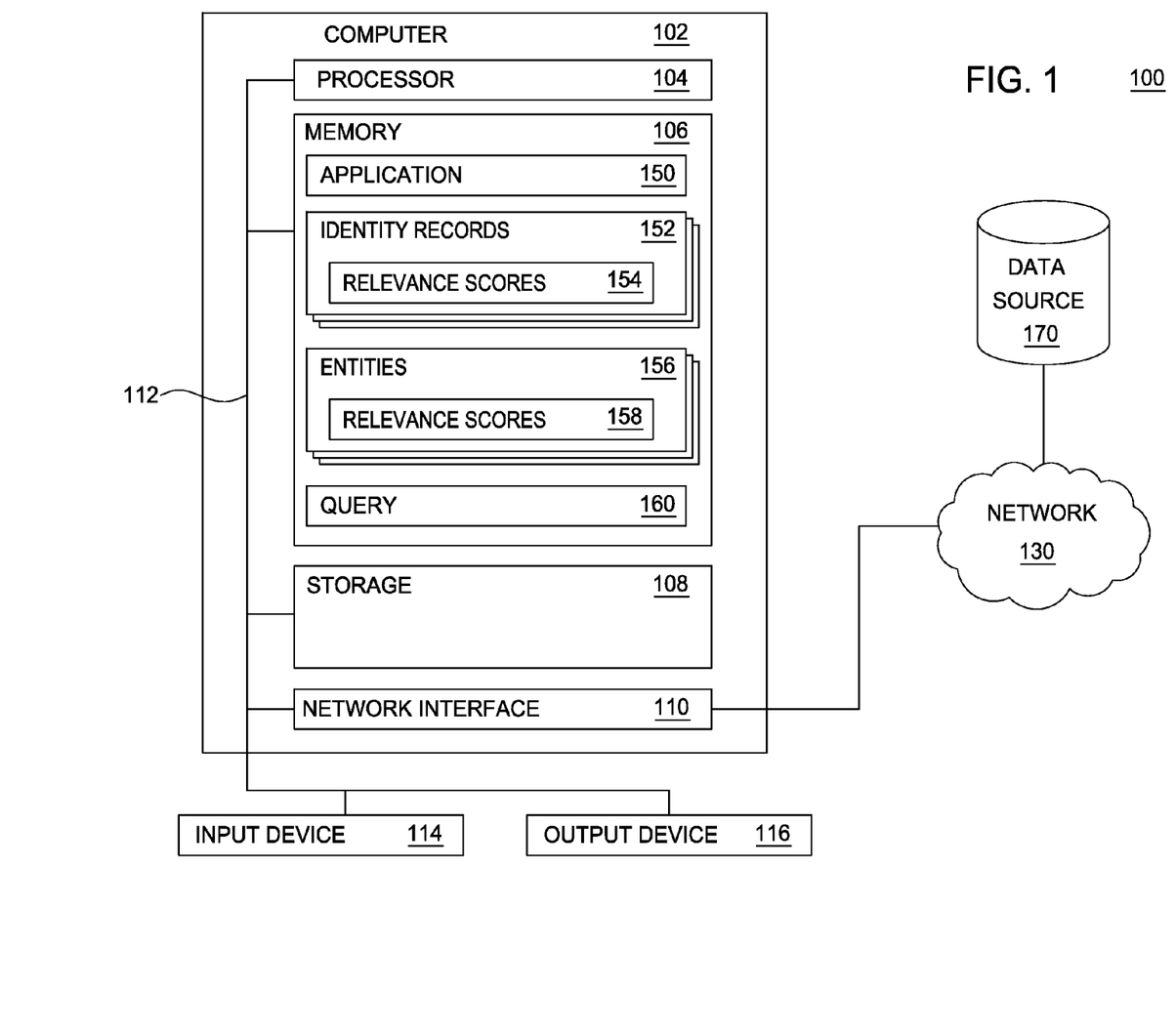
FIG. 1 is a block diagram illustrating a system for identity resolution, according to one embodiment of the invention.

FIG. 1 is a block diagram illustrating a system 100 for identity resolution, according to one embodiment of the invention. The networked system 100 includes a computer 102 that is connected to a data source 170 via a network 130. The computer 102 may also be connected to other computers via the network 130. The computer 102 may also be connected to other computers via the network 130. The data source 170 stores identity records to be sent to the application 150 and/or entity accounts that the identity records are resolved against. In general, the network 130 may be a telecommunications network and/or a wide area network (WAN). In a particular embodiment, the network 130 is the Internet.

The computer 102 generally includes a processor 104 connected via a bus 112 to a memory 106, a network interface device 110, a storage 108, an input device 114, and an output device 116. The computer 102 is generally under the control of an operating system. Examples of operating systems include UNIX, versions of the Microsoft Windows® operating system, and distributions of the Linux® operating system. More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single identity, it should be understood that the memory 106 may comprise a plurality of modules, and that the memory 106 may exist at multiple levels, from high speed registers and caches to lower speed but larger DRAM chips. The network interface device 110 may be any type of network communications device allowing the computer 102 to communicate with other computers via the network 130.

The storage 108 may be a persistent storage device. Although the storage 108 is shown as a single unit, the storage 108 may be a combination of fixed and/or removable storage devices, such as fixed disc drives, solid state drives, floppy disc drives, tape drives, removable memory cards or optical storage. The memory 106 and the storage 108 may be part of one virtual address space spanning multiple primary and secondary storage devices. Further, as described above, the application 150 receives identity records and/or entity accounts from the data source 170. Additionally or alternatively, the application 150 may also receive identity records and/or entity accounts via the storage 108.

The input device 114 may be any device for providing input to the computer 102. For example, a keyboard, keypad, light pen, touch-screen, track-ball, or speech recognition unit, audio/video player, and the like may be used. The output device 116 may be any device for providing output to a user of the computer 102. For example, the output device 116 may be any conventional display screen or set of speakers, along with their respective interface cards, i.e., video cards and sound cards (not shown). Although shown separately from the input device 114, the output device 116 and input device 114 may be combined. For example, a display screen with an integrated touch-screen, a display with an integrated keyboard, or a speech recognition unit combined with a text speech converter may be used.

As shown, the memory 106 of the computer 102 includes an application 150 for identity resolution, identity records 152, and entities 156. The application 150 may process the identity records 152 to resolve the identity records 152 to one or more of the entities 156. Each identity record 152 may include one or more relevance scores 154. Each relevance score 154 is qualified by at least one relevance type. The application 150 may also determine relevance scores 158 for the entities 156, based on the relevance scores 154 of identity records 152 that resolve to the entities 156. Each of the relevance scores 158 may also be qualified by at least one relevance type. The application 150 may further determine an overall relevance score for an entity, based on relevance scores of different relevance types for the entity. The application 150 may also receive a query 160 that specifies to retrieve entities satisfying predefined criteria, where the criteria include a specified relevance score threshold being exceeded for a specified relevance type (or for the overall relevance score). Advantageously, by configuring the application 150 to support relevance types, users of the application 150 are provided with improved flexibility in composing queries and/or generating reports on relevant entities.

Figure 2:
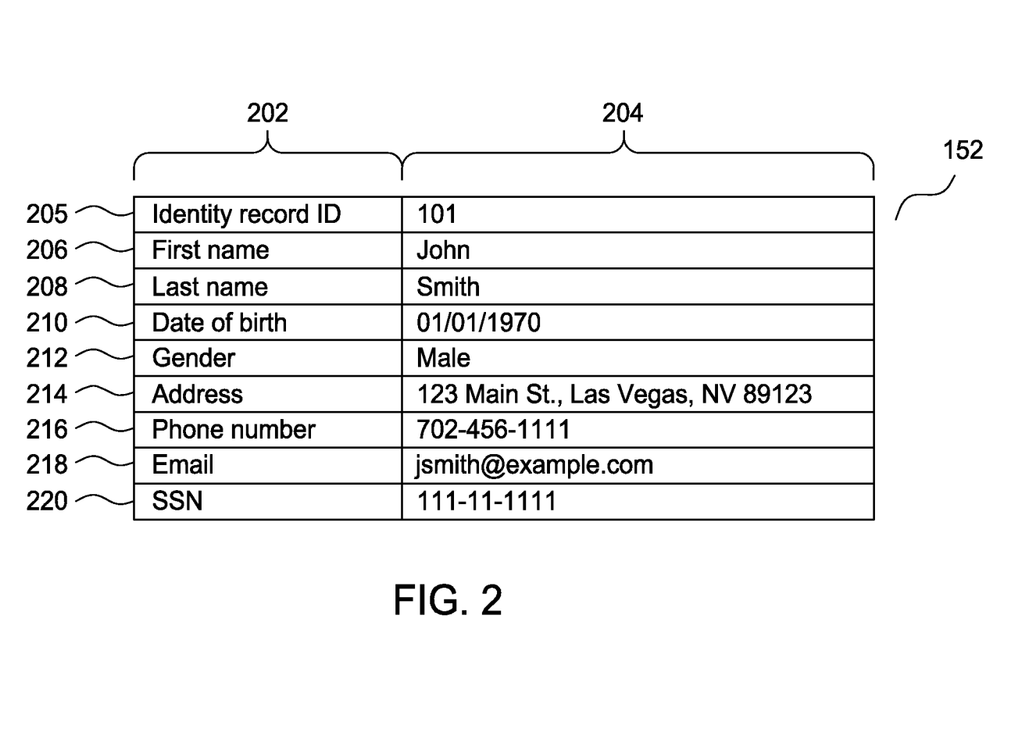
FIG. 2 illustrates an example of an identity record, according to one embodiment of the invention.

FIG. 2 illustrates an example of the identity record 152 of FIG. 1, according to one embodiment of the invention. As described above, the application 150 may receive and match the identity record 152 to at least one of the (existing) entities 156. As shown, the identity record 152 includes fields 202 and values 204. The fields 202 include an identity record ID 205, a first name 206, a last name 208, a date of birth 210, a gender 212, an address 214, a phone number 216, an email address 218, and a social security number (SSN) 220. As shown, the identity record ID for the identity record 152 is "101". The first name 206 in the identity record 152 is "John". The last name 208 in the identity record 152 is "Smith". The date of birth 210 in the identity record 152 is Jan. 1, 1970. The gender 212 in the identity record 152 is male. The address 214 in the identity record 152 is "123 Main St., Las Vegas, Nev. 89123". The phone number 216 in the identity record 152 is "702-456-1111". The email address 218 in the identity record 152 is "jsmith@example.com". The SSN 220 in the identity record 152 is "111-11-1111". Of course, those skilled in the art will appreciate that the fields 202 and values 204 shown in FIG. 2 are merely exemplary and are not intended to limit the scope of the disclosure.

Figure 3:
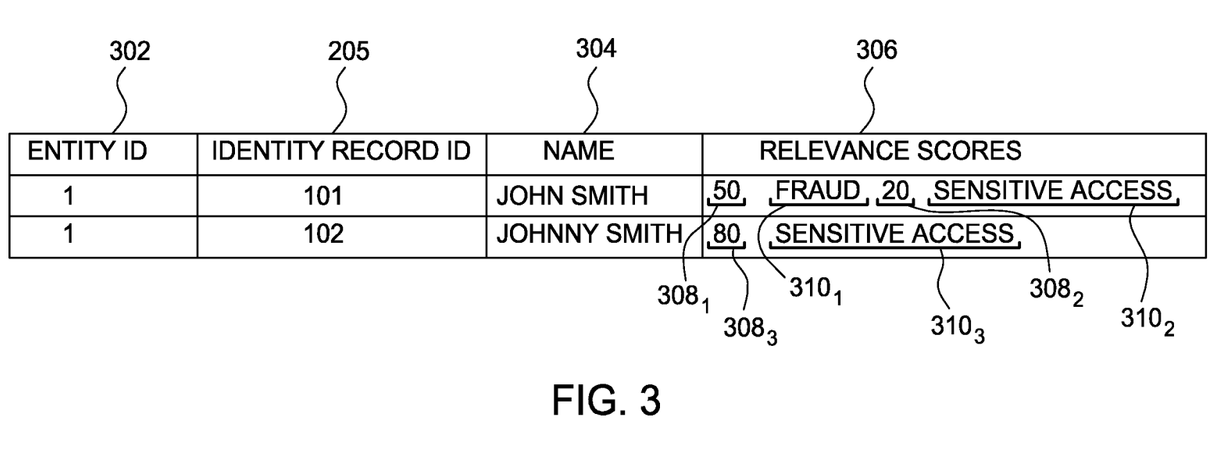
FIG. 3 illustrates examples of relevance scores assigned to identity records, according to one embodiment of the invention.

FIG. 3 illustrates examples of relevance scores assigned to identity records, according to one embodiment of the invention. As described above, each identity record 152 may be assigned one or more relevance scores 308, each relevance score being qualified by a respective relevance type 310. As shown, the identity records including a name field 304 and a relevance scores field 306 and having identity record IDs of "101" and "102" both resolve to an entity having an entity record ID 302 of "1". In particular, a first identity record for John Smith and a second identity record for Johnny Smith both resolve to the same entity. Assume that the relevance scores range on a scale from zero to one hundred, with one hundred representing the highest relevance. The first identity record is assigned a first relevance score 308₁ of "50" that is qualified by a relevance type 310₁ of "fraud", representing scores that are relevant to fraud detection. The first identity record is also assigned a second relevance score 308₂ of "20" that is qualified by a relevance type 310₂ of "sensitive access", representing scores that are relevant to users having access to sensitive information in an organization. The second identity record is assigned a first relevance score 308₃ of "80" that is qualified by a relevance type 310₃ of "sensitive access".

Depending on the embodiment, the relevance scores 308 may be assigned by a user or determined by the application 150 based on other data in the identity records or external to the identity records. The other data in the identity record may include a field that indicates a role assigned to the identity record. For example, an employee who is a chief executive officer (CEO) of a company may be assigned a relevance score having a value of "100" and having a relevance type of "employee rank", on the basis of the role field in the identity record. Similarly, an employee who is a middle manager of the company may be assigned a relevance score having a value of "50" and having a relevance type of "employee rank". If the middle manager also has an authority to sign off on purchases—e.g., as indicated by data external to the identity records for the middle manager—then the application 150 may increase the relevance score for the middle manager to a higher value, e.g., "60". Additionally or alternatively, the relevance scores of an identity record may also be determined at least in part based on a type of data source from which the identity record originates (such as an employee database or a vendor database).

In an alternative embodiment, instead of increasing a relevance score of relevance type "employee rank" based on purchasing authority in the company, another relevance score of relevance type "purchaser" may be included in the identity records. For a given identity record that represents an employee in the company, the relevance score of relevance type "purchaser" may be assigned a value based on a maximum dollar amount of purchases that the employee has authority to approve. For example, an identity record representing an employee that can only authorize small purchases may be assigned a purchaser relevance score of "20". The identity record may be assigned a purchaser relevance score of "50" if the employee can only authorize medium-sized purchases. Further, the identity record may be assigned a purchaser relevance score of "100" if the employee can authorize large purchases. Each purchaser relevance score may be determined based on a predefined expression provided by an administrative user, where the predefined expression may be any mathematical, programmatic, or natural language expression. Additionally or alternatively, each purchaser relevance score may be determined based on a user-defined mapping between maximum thresholds of dollar amount and corresponding values for relevance scores.

Further, in some embodiments, the identity record may also include an overall relevance score that characterizes all relevance scores of different types that are associated with the identity record. The overall relevance score of the identity record may indicate the significance of the identity record to an entity account that the identity record resolves to—relative to other identity records resolving to the entity account. The overall relevance score for each identity record may be determined based on a predefined expression provided by an administrative user. For example, if the predefined expression specifies to compute an average of all relevance scores of an identity record, then the identity record for "John Smith" in FIG. 3 may include an overall relevance score of "35", and the identity record for "Johnny Smith" may include an overall relevance score of "80". Further, depending on the embodiment, the application 150 may also be configured to search for identity records resolving to an entity and having an overall relevance score satisfying a threshold value, responsive to receiving a query that specifies the threshold value. The application 150 may then output a list of identity records, where the list may be sorted by predefined criteria, such as by ascending or descending overall relevance score. Advantageously, by configuring the application 150 to support different relevance types, each identity record 152 may be assigned multiple relevance scores, each relevance score representing a measure of relevance of a different type. Accordingly, users of the application 150 are provided with improved flexibility in composing queries and/or generating reports on relevant identity records.

Figure 4:
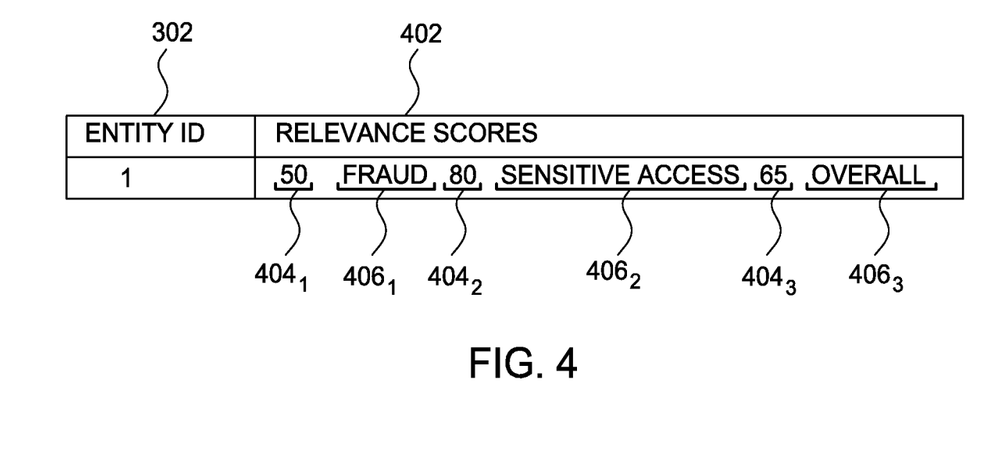
FIG. 4 illustrates examples of relevance scores assigned to entities, according to one embodiment of the invention.

FIG. 4 illustrates examples of relevance scores assigned to entities, according to one embodiment of the invention. As described above, in one embodiment, the application 150 determines relevance scores to assign to the entities. As shown, the entity having an entity ID 302 of "1" is assigned relevance scores 402. The application 150 may determine a relevance score 402 of a given relevance type 406, based on respective relevance scores 308 having the same relevance type 310. Further, in determining the relevance score 402, the application 150 may evaluate a predefined expression provided by an administrative user. For example, the predefined expression may specify to compute a relevance score of a given relevance type for an entity by averaging relevance scores of the same relevance type that are assigned to identity records resolving to the entity. Of course, mathematical operations other than averaging may be used, such as summing, determining a maximum value of a set, or any other user-defined operations. The predefined expression may also be specific to a relevance type. Accordingly, entity relevance scores for a first relevance type may be computed differently than entity relevance scores for a second relevance type.

Assume that the predefined expression specifies to compute the relevance scores for the relevance types "fraud" and "sensitive access" based on a maximum value of relevance scores of the same type, where the relevance scores are assigned to the identity records. Because the maximum value of the relevance score for "fraud" assigned to the identity records of FIG. 3 is "50", the application 150 determines, for the entity, the value of "50" as the relevance score 404₁ having a relevance type 406₁ of "fraud". Further, because the maximum value of the relevance score for "sensitive access" assigned to the identity records of FIG. 3 is "80", the application 150 determines, for the entity, the value of "80" as the relevance score 404₂ having a relevance type 406₂ of "sensitive access". Further still, in some embodiments, the application 150 may also determine a relevance score 404₃ of a relevance type 406₃ of "overall"—in other words, an overall relevance score—for the entity. The overall relevance score may be determined by a predefined expression provided by an administrative user. For example, the predefined expression may specify a weighted average to be computed across all other relevance scores assigned to the entity. To this end, the predefined expression may specify a respective weight for each relevance score assigned to the entity, where one or more of weights may be user-defined. The weights characterize some relevance scores as being more significant than other relevance scores in determining the overall relevance score for the entity. For example, relevance scores having a relevance type of "fraud" or "sensitive access" may be deemed more significant than a relevance score having a relevance type of "VIP" and may accordingly be assigned a higher weight. Still further, the application 150 may also be configured to update relevance scores for an entity, responsive to changes in relevance scores for an identity record that resolves to the entity.

Additionally or alternatively, in some embodiments, the application 150 may determine a relevance score for the entity based at least in part on a characteristic of the set of identity records that resolve to the entity, where the characteristic may not necessarily be evident from any individual identity record from the set. For example, assume that the entity includes a set of identity records, each having a distinct name of an individual. Although each identity record merely includes a single name of the individual, the set of identity records includes multiple distinct names for the individual, which may indicate that the individual is attempting to commit fraud using aliases. Accordingly, in some embodiments, the application 150 identifies a characteristic of having multiple distinct values for a given field (e.g., name of the individual) of the entity and determines or modifies a relevance score for the entity based on the identified characteristic.

Advantageously, by configuring the application 150 to support different relevance types at the entity level, each entity may be assigned multiple relevance scores, each relevance score representing a measure of relevance of a different type. Users of the application 150 are thereby provided with improved flexibility in composing queries and/or generating reports on the entities.

In one embodiment, the application 150 is further configured to generate alerts based on the relevance types. As described above, the application 150 may also include rules for detecting relevant identities, identities, conditions, or events, i.e., rules for generating alerts based on incoming identity records and/or resultant entities. In one embodiment, one or more of the rules may be dependent on a given relevance type. For example, the application 150 may be configured to update one or more relevance scores on the basis of processed events. For instance, assume multiple purchasing events are provided to the application 150, where the purchasing events are approved by the middle manager. In one embodiment, the application 150 increases a relevance score of a "purchaser" relevance type, upon every purchasing event approved by the middle manager. Although the amounts and/or frequency of the purchasing events may not necessarily trigger an alert, the relevance score of "purchaser" is maintained regularly to indicate that the middle manager is responsible for approving purchasing events and/or is using that authority within the company.

In one embodiment, the application 150 may be configured to generate alerts based on relevance types and relationships between entities. Each relationship may be characterized by a relationship type. Examples of relationship types include employer, employee, vendor, supplier, customer, spouse, father, mother, roommate, etc. Each relationship may also include a measure of strength of the respective relationship (also referred to as relationship strength). The relationship strength may be expressed as a numerical value between one and one hundred, with one hundred representing the highest strength. Each relationship type and relationship strength may be provided by a user or determined by the application 150.

Suppose that the name of the middle manager is John Doe, and that another individual, Jane Doe, is a known representative of one of the vendors of the company, having a "vendor" relevance score of "100". Suppose the application 150 identifies a relationship between the middle manager and the vendor, based at least in part on John Doe and Jane Doe residing at the same residential address and sharing the same credit card number. Suppose that the relationship has a relationship strength of "98" and a relationship type of "spouse". In one embodiment, the application 150 may generate an alert to indicate that the vendor is related to the middle manager and that the middle manager authorizes purchases at the company. Alternatively, a user may submit an appropriate query to the application 150 to identify the relationship between the middle manager and the vendor. Depending on the embodiment, an alert is generated when a relationship is discovered between an employee and a vendor, where the employee has a purchasing authority beyond a specified threshold. In other embodiments, the alert is only generated if the relationship is additionally of a given relationship type and/or has a relationship strength that exceeds a specified threshold. Advantageously, configuring the application 150 to support distinct relevance types allows such relationships to be identified more readily and/or conveniently at least in some cases.

Figure 5:
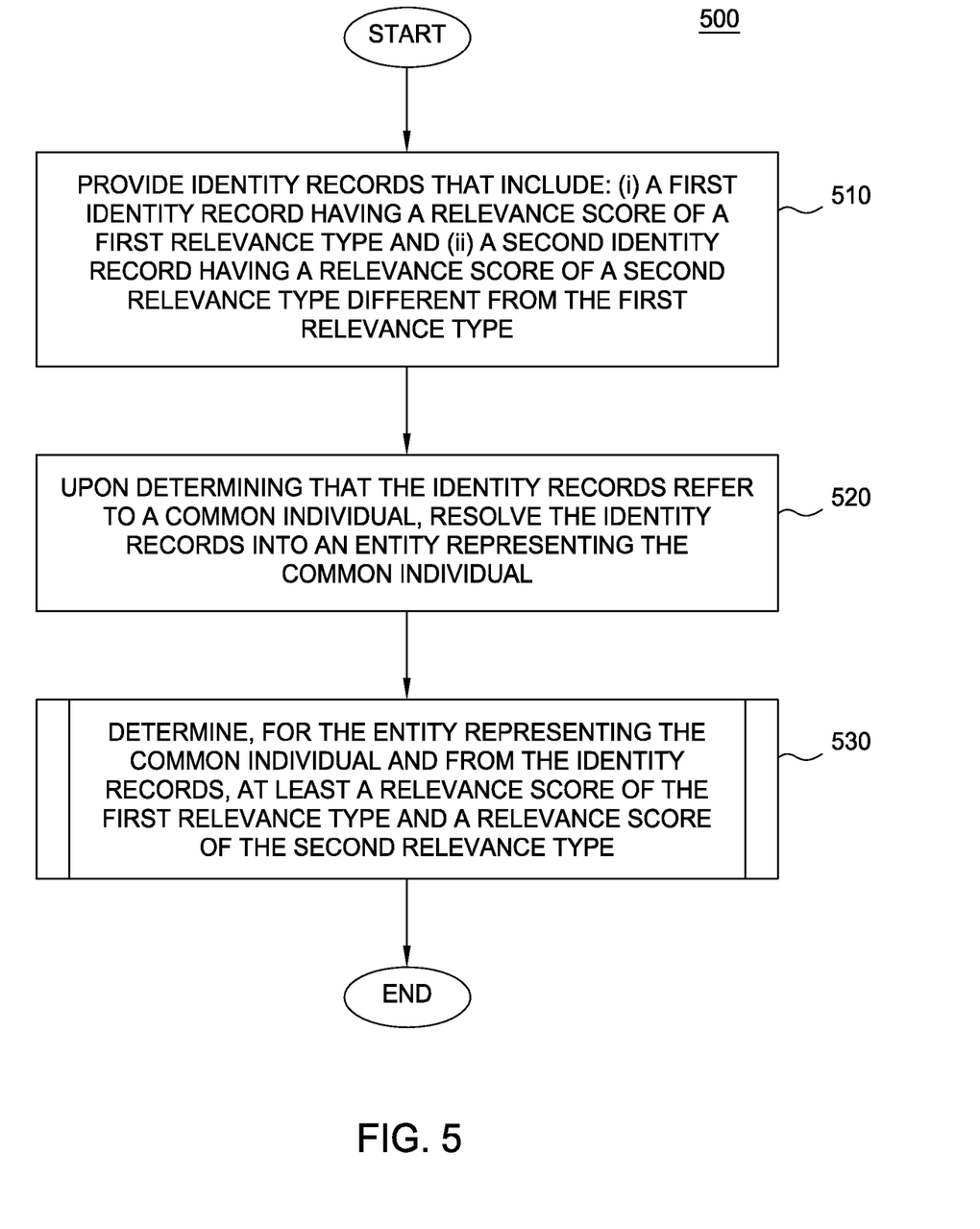
FIG. 5 is a flowchart depicting a method for providing relevance scores of distinct relevance types, according to one embodiment of the invention.

FIG. 5 is a flowchart depicting a method 500 for providing relevance scores of multiple relevance types, according to one embodiment of the invention. As shown, the method 500 begins at step 510, where identity records are provided that include at least a first identity record having a relevance score of a first relevance type and a second identity record having a relevance score of a second relevance type that is different from the first relevance type. At step 520, upon determining that the identity records refer to a common individual, the application 150 resolves the identity records into an entity representing the common individual. At step 530, the application 150 determines, for the entity and from the identity records, at least a relevance score of the first relevance type and a relevance score of the second relevance type. After the step 530, the method 500 terminates.

Figure 6:
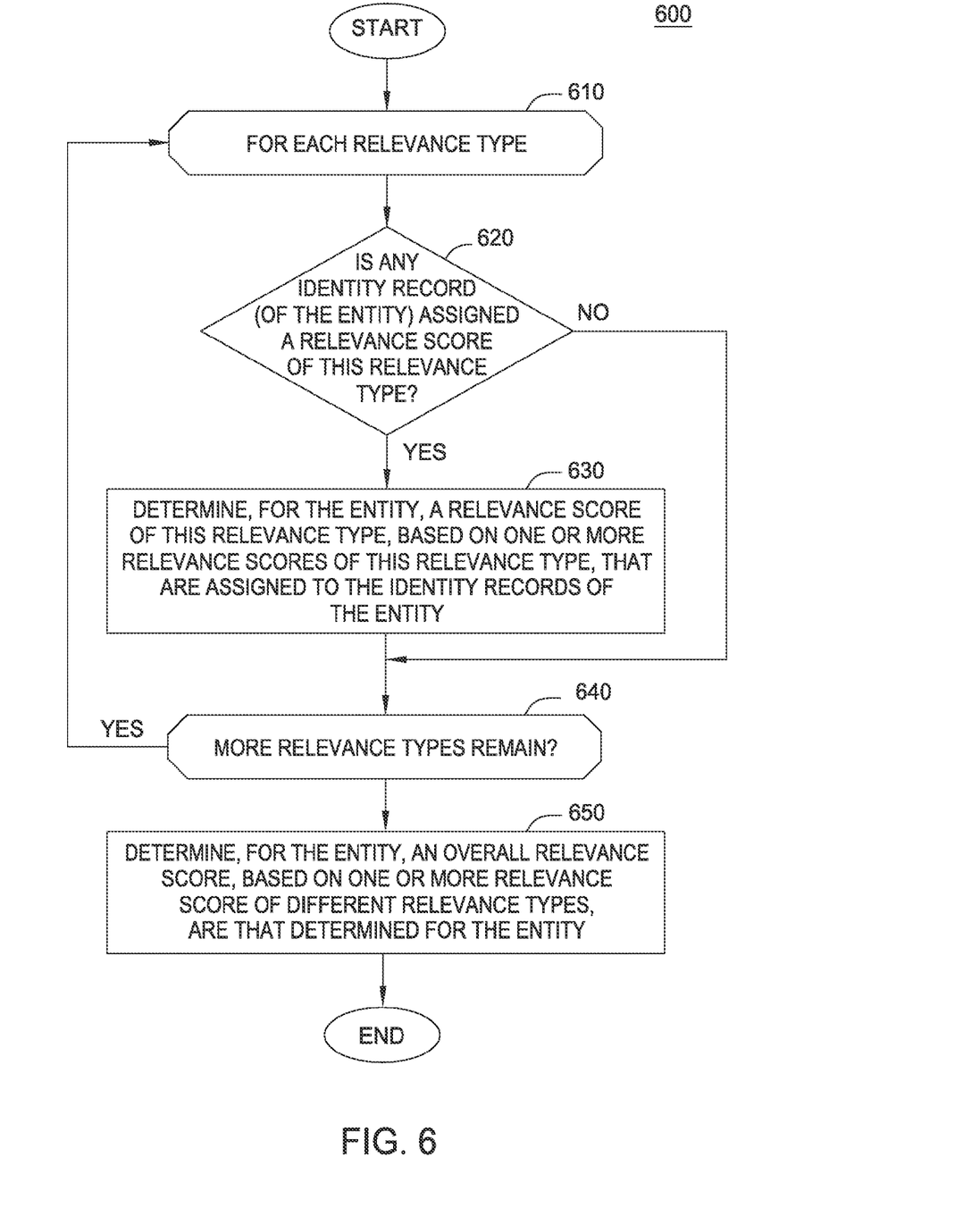
FIG. 6 is a flowchart depicting a method for determining relevance scores for an entity, according to one embodiment of the invention.

FIG. 6 is a flowchart depicting a method 600 for determining relevance scores for an entity, according to one embodiment of the invention. The method 600 corresponds to the step 530 of FIG. 3. As shown, the method 600 begins at step 610, where the application 150 enters a loop to process each relevance type. At step 620, the application 150 determines whether any identity records exist that resolve to the entity and that are assigned a relevance score of the given relevance type. If so, the method 600 proceeds to step 630, where the application 150 determines, for the entity, a relevance score of the given relevance type, based the relevance scores of the given relevance type that are assigned to the identity records of the entity. Additionally or alternatively, the relevance score of the given relevance type for the entity may also be determined at least in part on a characteristic of the set of identity records that resolve to the entity, where the characteristic may not necessarily be evident from any individual identity record of the set. After the step 630, the application 150 determines whether more relevance types remain to be processed (step 640). If so, the method 600 returns to the step 610 to process a next relevance type. Otherwise, the method 600 proceeds to step 650, where the application 150 determines, for the entity, an overall relevance score, based on one or more relevance scores of different relevance types previously determined for the entity. After the step 650, the method 600 terminates.

Figure 7:
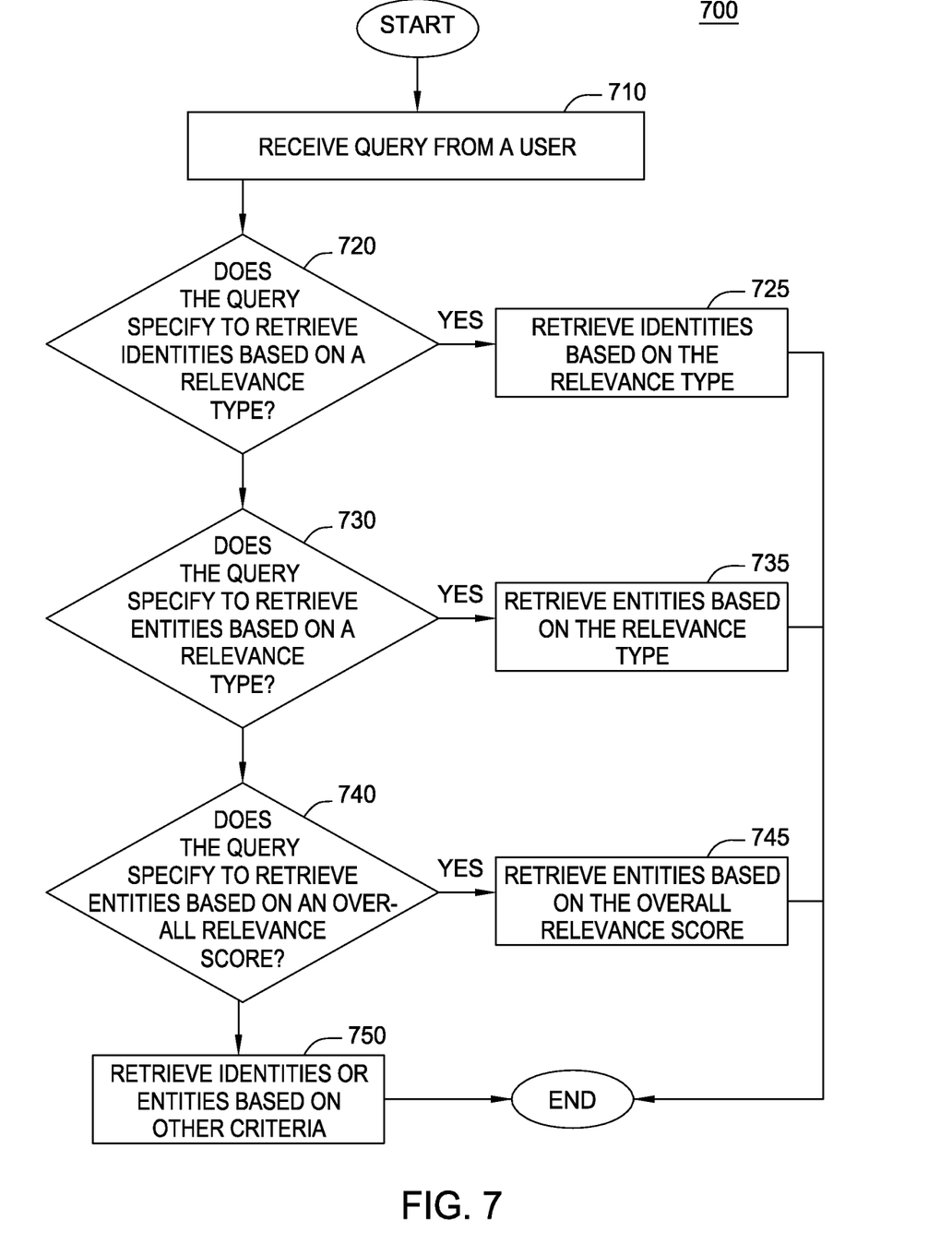
FIG. 7 is a flowchart depicting a method for processing a query based on relevance types, according to one embodiment of the invention.

FIG. 7 is a flowchart depicting a method 700 for processing a query based on relevance types, according to one embodiment of the invention. Once the relevance scores are computed for the entities in accordance with the method 600 of FIG. 6, the application 150 may process queries based on relevance types. To this end, the method 700 begins at step 710, where the application 150 receives a query from a user. The query may include one or more conditions pertaining to the relevance types. For example, the query may specify to retrieve only identity records that satisfy a minimum or maximum threshold value for a given relevance type. At step 720, the application 150 determines whether the query specifies to retrieve identifies based on a relevance type. If so, the application 150 retrieves identifies based on the relevance type (step 725). Otherwise, at step 730, the application 150 determines whether the query specifies to retrieve entities based on a relevance type. If so, the application 150 retrieves entities based on the relevance type (step 730). Otherwise, at step 740, the application 150 determines whether the query specifies to retrieve entities based on an overall relevance score. If so, the application 150 retrieves entities based on the overall relevance score (step 740). Otherwise, at step 750, the application 150 retrieves identities or entities based on other criteria as specified by the query. After the steps 725, 735, 745, or 750, the method 700 terminates.

Advantageously, embodiments of the invention provide techniques for configuring an entity resolution application to support distinct relevance types. One embodiment provides identity records to the application, where the identity records are assigned relevance scores of distinct relevance types. Upon determining that the identity records refer to a common individual, the application resolves the identity records into an entity representing the common individual. The application then determines, for the entity representing the common individual and from the identity records, at least the relevance scores of the distinct relevance types. Advantageously, the application may generate alerts and/or respond to queries pertaining to the distinct relevance types, thereby providing users of the application with improved flexibility and convenience in discovering relevant identifies and/or entities.

While the foregoing is directed to embodiments of the present invention, other and further embodiments of the invention may be devised without departing from the basic scope thereof, and the scope thereof is determined by the claims that follow.

What is claimed is:

1. A computer-implemented method to provide typed entity relevance scores in an identity resolution system, based on typed identity relevance scores, the method comprising:

accessing a plurality of identity records in the identity resolution system, wherein the plurality of identity records includes at least: (i) a first identity record having an identity relevance score of a first relevance type; and (ii) a second identity record having an identity relevance score of a second relevance type, different from the first relevance type, each identity relevance score representing a respective measure of importance of an individual to which the identity record having the respective identity relevance score pertains;

upon determining the plurality of identity records refer to a common individual, resolving the plurality of identity records into an entity representing the common individual; and determining, for the entity representing the common individual and based on one or more predefined functions of the identity relevance scores in the plurality of identity records, at least an entity relevance score of the first relevance type and an entity relevance score of the second relevance type by operation of one or more computer processors, each entity relevance score representing a respective measure of importance of the common individual represented by the entity.

2. The computer-implemented method of claim 1, further comprising:

determining, from the determined entity relevance scores of the first and second relevance types, an overall entity relevance score for the entity representing the common individual.

3. The computer-implemented method of claim 2, further comprising:

generating an alert upon determining that a threshold is exceeded by at least one of:
(i) the identity relevance score of the first relevance type of the first identity record;
(ii) the identity relevance score of the second relevance type of the second identity record;
(iii) the entity relevance score of the first relevance type of the entity;
(iv) the entity relevance score of the second relevance type of the entity; and
(v) the overall entity relevance score for the entity.

4. The computer-implemented method of claim 1, further comprising:

determining the identity relevance score of the first relevance type of the first identity record has been modified;

determining, for the entity representing the common individual, an updated entity relevance score of the first relevance type, based on the modified identity relevance score of the first relevance type of the first identity record.

5. The computer-implemented method of claim 1, further comprising:

upon determining that the plurality of identity records satisfies predefined criteria, determining, for the entity representing the common individual, an updated entity relevance score of the first relevance type.

6. The computer-implemented method of claim 1, wherein the identity relevance score of the first relevance type is provided based on at least one of: (i) user input; (ii) one or more events pertaining to the first identity record; and (iii) one or more roles assigned to the first identity record.

7. The computer-implemented method of claim 1, wherein the plurality of identity records is determined to refer to a common individual based on one or more predefined resolution rules.

8. The computer-implemented method of claim 1, further comprising:

generating, for the entity representing the common individual, an updated entity relevance score of the first relevance type based on a count, across the plurality of identity records, of distinct attribute values for an attribute.

9. The computer-implemented method of claim 1, wherein the entity relevance score of the first relevance type is determined based on a first predefined function of the identity relevance score of the first relevance type, wherein the entity relevance score of the second relevance type is determined based on a first predefined function of the identity relevance score of the second relevance type.

10. The computer-implemented method of claim 9, wherein the first predefined function is not a function of the identity relevance score of the second relevance type, wherein the second predefined function is not a function of the identity relevance score of the first relevance type.

11. The computer-implemented method of claim 10, wherein the first predefined function is specific to the first relevance type, wherein the second predefined function is specific to the second relevance type, wherein the first and second predefined functions are distinct functions.

12. The computer-implemented method of claim 11, wherein each of the first and second predefined function is in a form of a respective expression provided based on input from an administrative user, wherein the entity relevance score of the first relevance type is a different numerical score than the identity relevance score of the first relevance type, wherein the entity relevance score of the second relevance type is a different numerical score than the identity relevance score of the second relevance type.

13. The computer-implemented method of claim 12, wherein each identity record is uniquely identified via a record identifier, wherein each entity record is uniquely identified via an entity identifier different from the record identifier, wherein the first identity record further includes an identity score of the second relevance type, wherein the second identity record further includes an identity score of the first relevance type, wherein the first predefined function is a function of the identity score of the first relevance type in the second identity record, wherein the second predefined function is a function of the identity score of the second relevance type in the first identity record.

14. The computer-implemented method of claim 13, further comprising:
 determining, from the determined entity relevance scores of the first and second relevance types, an overall entity relevance score for the entity representing the common individual.

15. The computer-implemented method of claim 14, wherein the entity relevance scores of the first and second relevance types are determined by an identity resolution application, wherein the administrative user comprises an administrative user of the identity resolution application, wherein the identity resolution application is configured to independently generate an alert upon determining that a threshold is exceeded by each individual relevance score selected from:
 (i) the identity relevance score of the first relevance type of the first identity record;
 (ii) the identity relevance score of the second relevance type of the second identity record;
 (iii) the entity relevance score of the first relevance type of the entity;
 (iv) the entity relevance score of the second relevance type of the entity; and
 (v) the overall entity relevance score for the entity.

16. The computer-implemented method of claim 15, further comprising:
 determining the identity relevance score of the first relevance type of the first identity record has been modified; and
 determining, for the entity representing the common individual, an updated entity relevance score of the first relevance type, based on the modified identity relevance score of the first relevance type of the first identity record.

17. The computer-implemented method of claim 16, further comprising:
 upon determining that the plurality of identity records satisfies predefined criteria, determining, for the entity representing the common individual, an updated entity relevance score of the first relevance type;
 wherein the identity resolution application is further configured to independently determine entity relevance scores based on each individual predefined function selected from: (i) an average; (ii) a weighted average, wherein each relevance type has a distinct, associated weight; (iii) a sum; (iv) a maximum; and (v) a minimum.

18. The computer-implemented method of claim 17, wherein the identity resolution application is further configured to independently retrieve a filtered result set from the identity resolution system and based on each individual user-specified filter included in a respective query and selected from:
 (i) identity records having a specified identity relevance score of a specified relevance type;
 (ii) entities having a specified entity relevance score of the specified relevance type; and
 (iii) entities having a specified overall entity relevance score.

19. The computer-implemented method of claim 18, wherein the identity resolution application is further configured to independently provide the identity relevance score of the first relevance type based on each individual input selected from: (i) user input; (ii) one or more events pertaining to the first identity record; and (iii) one or more roles assigned to the first identity record.

20. The computer-implemented method of claim 19, wherein the plurality of identity records is determined to refer to a common individual based on one or more predefined resolution rules, and wherein the method further comprises:
 generating, for the entity representing the common individual, an updated entity relevance score of the first relevance type based on a count, across the plurality of identity records, of distinct attribute values for an attribute.

* * * * *